United States Patent [19]
DeKoning et al.

[11] Patent Number: 6,108,684
[45] Date of Patent: Aug. 22, 2000

[54] METHODS AND APPARATUS FOR BALANCING LOADS ON A STORAGE SUBSYSTEM AMONG A PLURALITY OF CONTROLLERS

[75] Inventors: Rodney A. DeKoning; Gerald J. Fredin; Charles D. Binford, all of Wichita, Kans.

[73] Assignee: LSI Logic Corporation, Milpitas, Calif.

[21] Appl. No.: 08/772,618

[22] Filed: Dec. 23, 1996

[51] Int. Cl.[7] .................................................. G06F 13/00
[52] U.S. Cl. ........................... 709/105; 709/100; 709/104
[58] Field of Search ................................. 395/675, 825; 709/100, 105, 104

[56] References Cited

U.S. PATENT DOCUMENTS

| | | |
|---|---|---|
| 3,702,006 | 10/1972 | Page et al. . |
| 5,313,584 | 5/1994 | Tickner et al. ........................ 395/275 |
| 5,317,731 | 5/1994 | Dias et al. ............................. 395/600 |
| 5,440,743 | 8/1995 | Yokota et al. ......................... 395/650 |
| 5,459,864 | 10/1995 | Brent et al. ........................... 395/650 |
| 5,682,537 | 10/1997 | Davies et al. ......................... 395/726 |
| 5,694,571 | 12/1997 | Fuller et al. . |
| 5,764,922 | 6/1998 | Peacock et al. ....................... 395/275 |
| 5,787,304 | 7/1998 | Hodges et al. . |
| 5,875,343 | 2/1999 | Binford et al. ........................ 395/736 |

FOREIGN PATENT DOCUMENTS

| | | |
|---|---|---|
| 0493984 | 7/1992 | European Pat. Off. ........ G06F 11/10 |
| 0551718 | 7/1993 | European Pat. Off. ........ G06F 11/20 |
| 0707269 | 4/1996 | European Pat. Off. ........ G06F 12/08 |
| 0645702 | 3/1995 | Germany . |

*Primary Examiner*—Lucien U. Toplu
*Assistant Examiner*—Phuong To

[57] ABSTRACT

Methods and associated apparatus for balancing the I/O request processing load within a plurality of controllers in a storage subsystem. The methods of the present invention are operable within interconnected controllers of a storage subsystem to shift the processing of received I/O requests to less loaded controllers and to do so in a manner transparent to legacy attached host systems. In a first embodiment of the present invention referred to as back-end load balancing, I/O requests are transferred from a first controller, to which the I/O request was directed by the attached host system, to a second controller for further processing. In this back-end load balancing embodiment, all write data associated with a write request as well as returned information including status or read data, is exchanged between the first and second controllers such that the first controller performs all communication with the attached host system. In a second embodiment referred to as front-end load balancing, the first controller receives an I/O request and transfers the request of a second controller. The second controller then completes the I/O request including any requisite communication with the attached host system to receive write data from the host system or to return status or read data to the host system. The second controller uses a false ID value, or otherwise substitutes itself for he first controller, in communicating with the attached host system such that the attached host system is fooled to believe that all communication is with first controller.

13 Claims, 6 Drawing Sheets

METHODS AND APPARATUS FOR BALANCING LOADS ON A STORAGE SUBSYSTEM AMONG A PLURALITY OF CONTROLLERS

RELATED PATENTS

The present invention is related to commonly assigned and co-pending U.S. patent application entitled "Methods And Apparatus For Coordinating Shared Multiple Raid Controller Access To Common Storage Devices", invented by Rodney A. DeKoning and Gerald Fredin, and having an internal docket number of 96-029 and a Ser. No. 08/772,614, filed concurrently herewith on Dec. 23, 1996, and co-pending U.S. patent application entitled "Methods And Apparatus For Locking Files Within A Clustered Storage Environment", invented by Rodney A. DeKoning and Gerald Fredin, and having an internal docket number of 96-028 and a Ser. No. 08/773,470, filed concurrently herewith on Dec. 23, 1996, both of which are hereby incorporated by reference.

BACKGROUND OF THE INVENTION

1. Field of the Invention

The present invention relates to RAID storage subsystems and in particular to methods and associated apparatus which balance the load of processing I/O requests among a plurality of controllers within such storage subsystems.

2. Discussion of Related Art

It is known in the art that a plurality of host computing systems may be attached to a common storage subsystem. In such a configuration several host generated I/O requests may be transmitted to the storage subsystem for processing. It is also known to utilize a plurality of controllers within a storage subsystem to enhance reliability and/or performance. As discussed in co-pending patent application 96-029, a plurality of control modules (also referred to herein as controllers) may be used within a single storage subsystem to enhance reliability (through redundancy) as well as to enhance performance (through coordinated shared access to commonly attached storage devices).

Older (e.g., legacy) host computer systems generating I/O requests are typically unaware of the plurality of controllers within the storage subsystem. In fact, such multiple controller storage systems are typically designed to make the added processing power transparent to the attached host systems. It is therefore possible for the attached host systems to overload one of the plurality of controllers within the storage subsystem by transmitting all I/O requests to a single controller in the storage subsystem.

Host computer systems attached to multiple controller storage subsystems may be modified to more fully utilize the processing power of the multiple controllers by distributing the I/O requests evenly over the plurality of controllers in the storage subsystem. However, it is often undesirable or impossible to modify older (legacy) systems to enhance performance by balancing loads over the storage subsystems in accordance with the needs of a new storage subsystem. In addition, in many common multiple host attachment configurations, the hosts have no knowledge of the loads imposed on the common storage device by other host systems thereby making host side load balancing impossible.

In view of the above it is clear that a need exists for an improved method and apparatus for distributing I/O requests from host computer among a plurality of controllers within a storage subsystem. In particular, a need exists for so distributing I/O requests to balance the processing load over a plurality of storage subsystem controllers in a manner which is transparent to attached legacy host computing systems.

SUMMARY OF THE INVENTION

The present invention solves the above and other problems, and thereby advances the useful arts, by providing methods and associated apparatus which balances the I/O request processing load among a plurality of controllers in a storage subsystem and in such a manner as to be transparent to attached legacy host computer systems. In particular, the methods of the present invention are operable within a plurality of interconnected controllers within a storage subsystem to exchange messages among the controllers in order to pass an I/O request received from an attached host system to another controller for processing. An I/O request is passed from a first controller, the controller which received the host request, to a second controller, a controller determined to be less loaded than the first controller. Replies or status which must be exchanged with the requesting host computer are returned in such a manner that the host system is unaware of the passing of control from a first controller to a second controller.

In particular an I/O request is received by one of the plurality of controllers within the storage subsystem. If the subsystem determines that the request may be better processed by another of the plurality of controllers, the request is passed to an identified one of the other controllers. The request is passed from a first controller to a second controller as a message transmitted via a communication path which connects the controllers to common shared storage devices (SSD). In an environment having a plurality of controllers sharing access to common storage devices, it is common for I/O requests to be exchanged among the controllers for purposes of maintaining consistency in redundant cache memories. Methods relating to cache and storage device consistency are clearly taught in co-pending patent application 96-029 which is incorporated herein by reference. The methods of the present invention therefore do not significantly increase the overhead bandwidth required of the communication medium connecting the multiple controllers. Rather, a modest volume of additional control information is transmitted in addition to the data exchanged for purposes of synchronizing redundant caches.

The second controller then performs the requested I/O operation in place of the first controller which originally received the I/O request. Any required status or replies required to be returned to the requesting host system are returned such that the host system is oblivious to the actual controller which performed the request. All returned status is therefore transmitted to the requesting host system as though from the controller to which the request was originally sent.

In one embodiment of the present invention referred to herein as Back-end Balancing, any write data associated with the I/O request as well as the return information is exchanged between the requesting host system and the first controller (the controller to which the request was initially directed). The first controller then exchanges any required data with the second controller (actually performing the I/O request) to allow the second controller to complete the I/O request. Any return data generated by the second controller and therefore sent back to the first controller and is then returned to the host system by the first controller (as expected by the host system). This approach is usable regardless of the topology of connections between the requesting host system and the second controller (the controller actually performing the I/O request). The controllers need not be commonly attached to the host system. Rather, the controllers require a communication channel between one another implemented within, or in addition to, the common communication channel to the shared storage devices (SSD).

One of ordinary skill in the art will recognize the back-end load balancing may provide benefit in overall storage subsystem performance for write operations but may provide little benefit for read operations. It will be further noted by those skilled in the art that this back-end load balancing technique may be applied with little additional overhead on the controllers where write-back mirrored cache processing is utilized.

A second embodiment of the invention referred to herein as Front-end Balancing is usable where both the first and second controllers are commonly attached to the requesting host system. The first controller initially receives an I/O request from an attached host system but neither processes the request nor receives data from the host system associated with a write request. The second controller interacts directly with the host system via the commonly attached host system's I/O adapter to complete the processing of the I/O request. In particular, the second controller exchanges any data associated with a read or write I/O request directly with the host system. In addition, the second controller returns any status information directly to the requesting host system. Front-end load balancing therefore may be beneficially applied to both read and write request processing to improve overall storage subsystem performance.

The second controller provides false identification information to the requesting host system to fool the host into believing it is interacting with the first controller. Providing false identification (also referred to herein as spoofing or substitution) is possible where the first and second controller communicate with a common host system through a communication medium where the communication medium allows such false identification signals or lacks identification verification. Precise methods and means for providing such a false identification are specific to the particular communication medium and protocols used in communicating between the various devices. More generally, the fake or false identification may be referred to herein as substitution of the second device for the first device in communications with the host systems. Some communication media and protocols may require external circuits or software to achieve the desired substitution while others permit such features as part of the standard communication specifications.

Other messages exchanged among the plurality of commonly attached controllers of the storage subsystem enable the controllers to share loading information. Each controller in the storage subsystem may therefore estimate the present load on each controller and re-distribute received I/O requests to other controllers to balance the load among the plurality of controllers. The overall performance of the storage subsystem is enhanced by better utilization of the processing power within the storage subsystem. In addition, load balancing is performed within the storage subsystem in a manner transparent to attached host systems. Legacy host systems may therefore benefit from the enhanced performance of the storage subsystem of the present invention.

It is therefore an object of the present invention to provide methods and associated apparatus for improving performance of a storage subsystem by balancing the load within the storage subsystem over a plurality of controllers therein.

It is a further object of the present invention to provide methods and associated apparatus for balancing the processing load within a plurality of controllers of a storage subsystem.

It is still a further object of the present invention to provide methods and associated apparatus for improving performance of a storage subsystem by balancing the load within the storage subsystem over a plurality of controllers therein in a manner transparent to attached legacy host systems.

It is another object of the present invention to provide methods and associated apparatus for balancing the processing load within a plurality of controllers of a storage subsystem in a manner transparent to attached legacy host systems.

It is still another object of the present invention to provide back-end load balancing methods and associated apparatus for improving performance of a storage subsystem by balancing the load within the storage subsystem over a plurality of interconnected controllers therein.

It is yet another object of the present invention to provide back-end load balancing methods and associated apparatus for balancing the processing load within a plurality of interconnected controllers of a storage subsystem.

It is yet a further object of the present invention to provide front-end load balancing methods and associated apparatus for improving performance of a storage subsystem by balancing the load within the storage subsystem over a plurality of controllers therein commonly attached to a host system.

It is another object of the present invention to provide front-end load balancing methods and associated apparatus for balancing the processing load within a plurality of controllers commonly attached to a host system.

The above and other objects, aspects, features, and advantages of the present invention will become apparent from the following description and the attached drawing.

DETAILED DESCRIPTION OF THE PREFERRED EMBODIMENT

Figure 1:
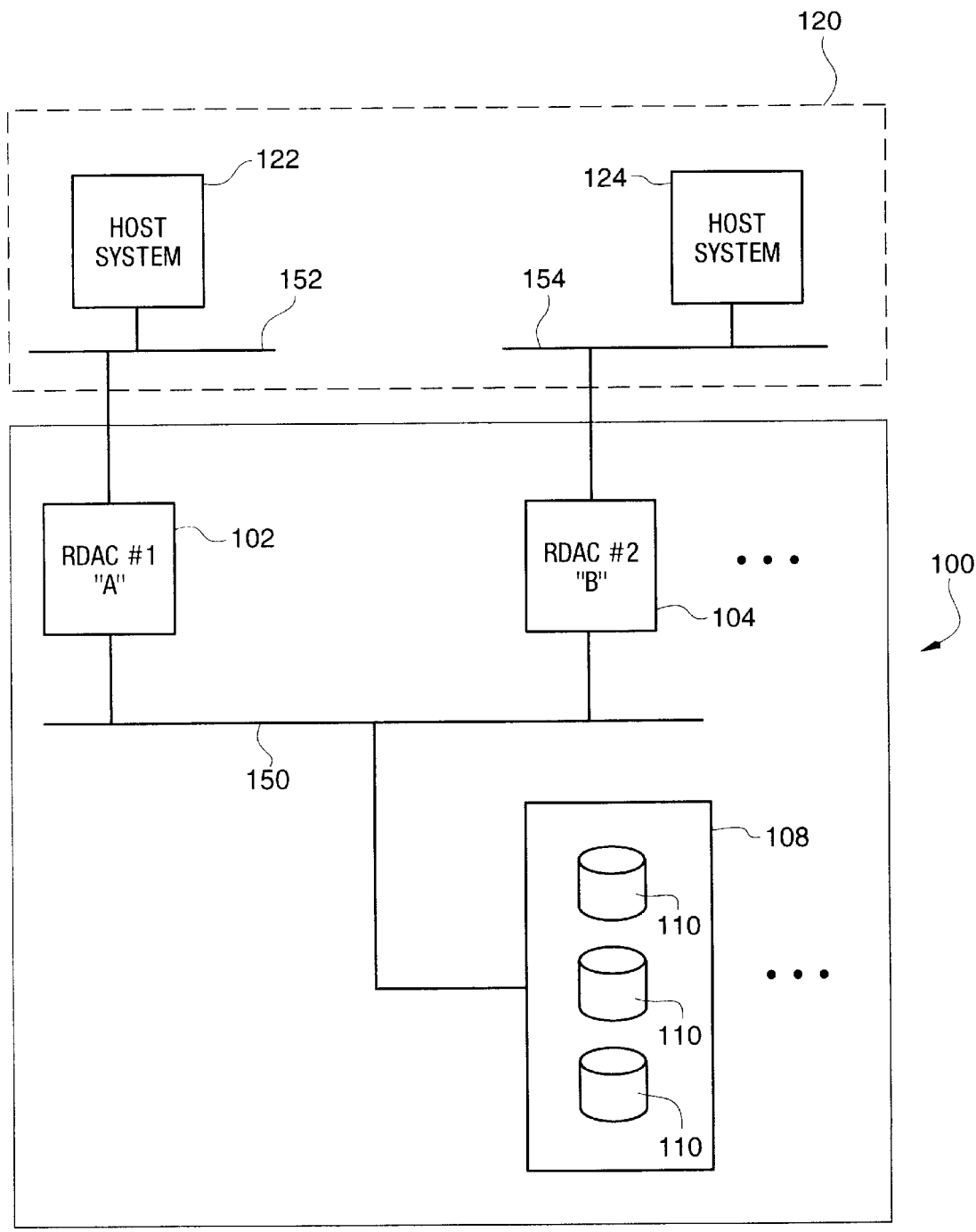
FIG. 1 is a block diagram of a computing environment in which the back-end load balancing techniques of the present invention may be embodied.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

LOAD BALANCING OVERVIEW

The methods of the present invention are operable to balance the processing load within a storage subsystem having a plurality of cooperating controllers. One or more attached host systems generate I/O requests (e.g., read and write requests) to retrieve and store data within the storage subsystem. A plurality of attached host systems transfer I/O requests to the storage subsystem for processing therein. In RAID storage subsystems for example, the host system typically directs its request to a particular LUN within the subsystem.

Co-pending patent application 96-029 discloses the general structure and operation of a storage subsystem having a plurality of control modules (controllers) commonly attached to a plurality of storage devices in the storage subsystem. Specifically taught is a RAID storage subsystem in which a plurality of controllers provide both redundancy of the control operations and performance enhancement for the RAID storage subsystems. The plurality of controllers exchange messages to coordinate the concurrent use of multiple controllers accessing the common logical unit (a LUN residing on disk drives commonly attached to the plurality of controllers).

As disclosed in co-pending patent application 96-029 one of the plurality of cooperation controllers is designated as the primary controller with respect to a particular LUN of the subsystem. Other controllers commonly attached to the same LUN are referred to as secondary controllers. The primary and secondary controllers associated with a LUN exchange messages to coordinate shared access to the LUN.

In a typical RAID application, one host system may direct I/O requests to one of the plurality of controllers while another host system may direct I/O requests for the same LUN to another controller. In such a configuration, the host systems may overload one controller with I/O requests while another controller (e.g., a secondary controller associated with the same LUN) will be less loaded. Legacy host systems cannot be easily modified to coordinate I/O requests so as to better balance the loading of all controllers attached to the common LUN. Or, the topology of the communications among the host systems and storage controllers may preclude a host system from directly accessing multiple controllers in the storage subsystem.

Although the present invention is described in detail below in the context of RAID storage management configurations, the methods are applicable to any storage subsystem in which a plurality of controllers are commonly attached to shared storage devices (SSD). A RAID subsystem is but one common example of such a configuration. Therefore, as presented hereinbelow, discussion of RAID LUNs should be interpreted as synonymous with any configuration having a plurality of controllers commonly attached to shared storage devices (SSD).

The methods of the present invention are therefore operable within a storage subsystem having a plurality of controllers to balance the I/O request processing load within the storage subsystem in a manner transparent to the host systems. The methods of the present invention exchange messages and data as discussed elsewhere herein to transfer I/O requests (and associated data) from more heavily loaded controllers to less heavily loaded controllers. The data and information normally exchanged between the host system generating the I/O request and the controller to which the request is directed is performed in accordance with the methods of the present invention so as to hide from the host system the identity of the controller which actually performed the I/O request processing.

Figure 2:
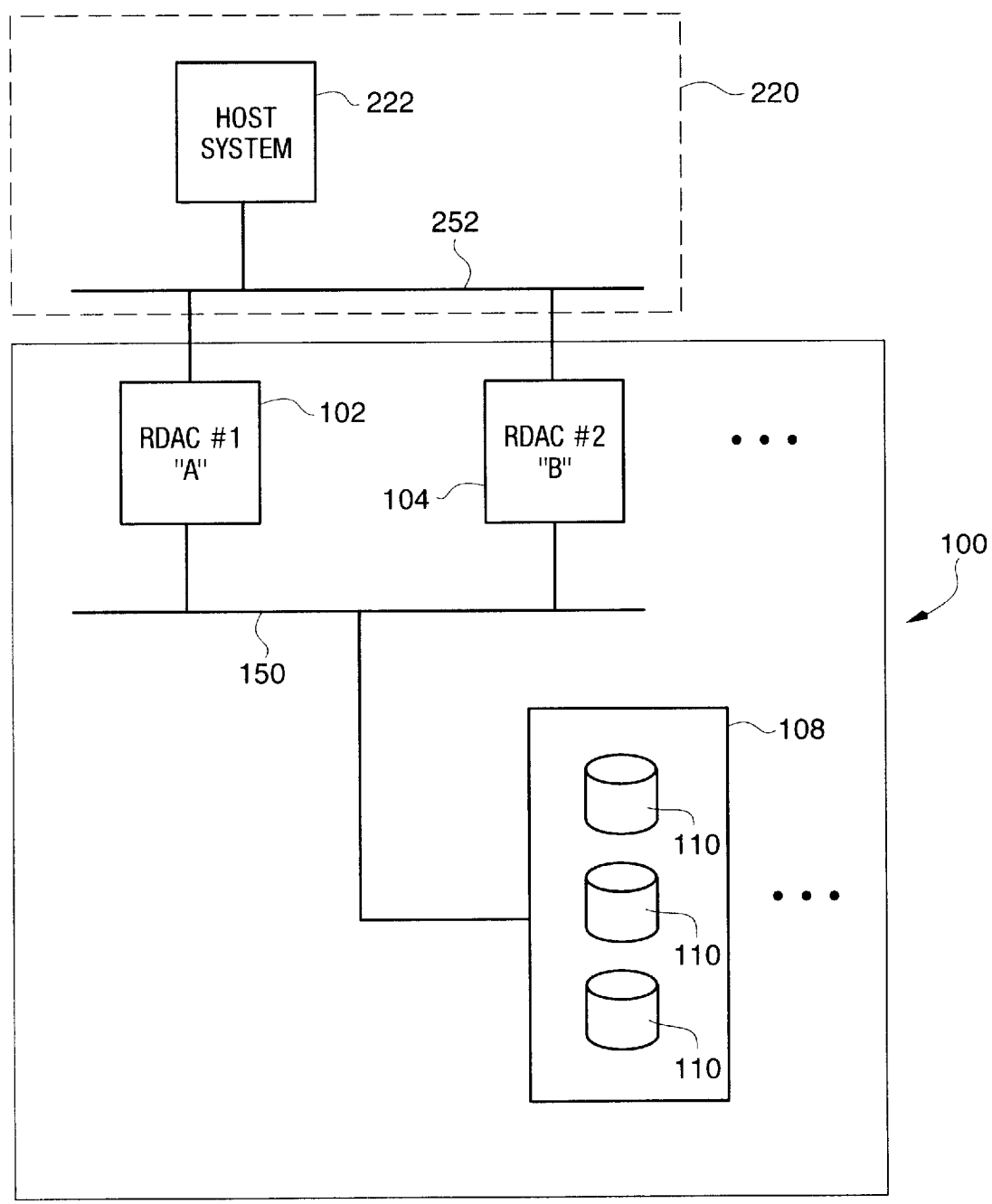
FIG. 2 is a block diagram of a computing environment in which either the back-end or front-end load balancing techniques of the present invention may be embodied.
Figure 3:
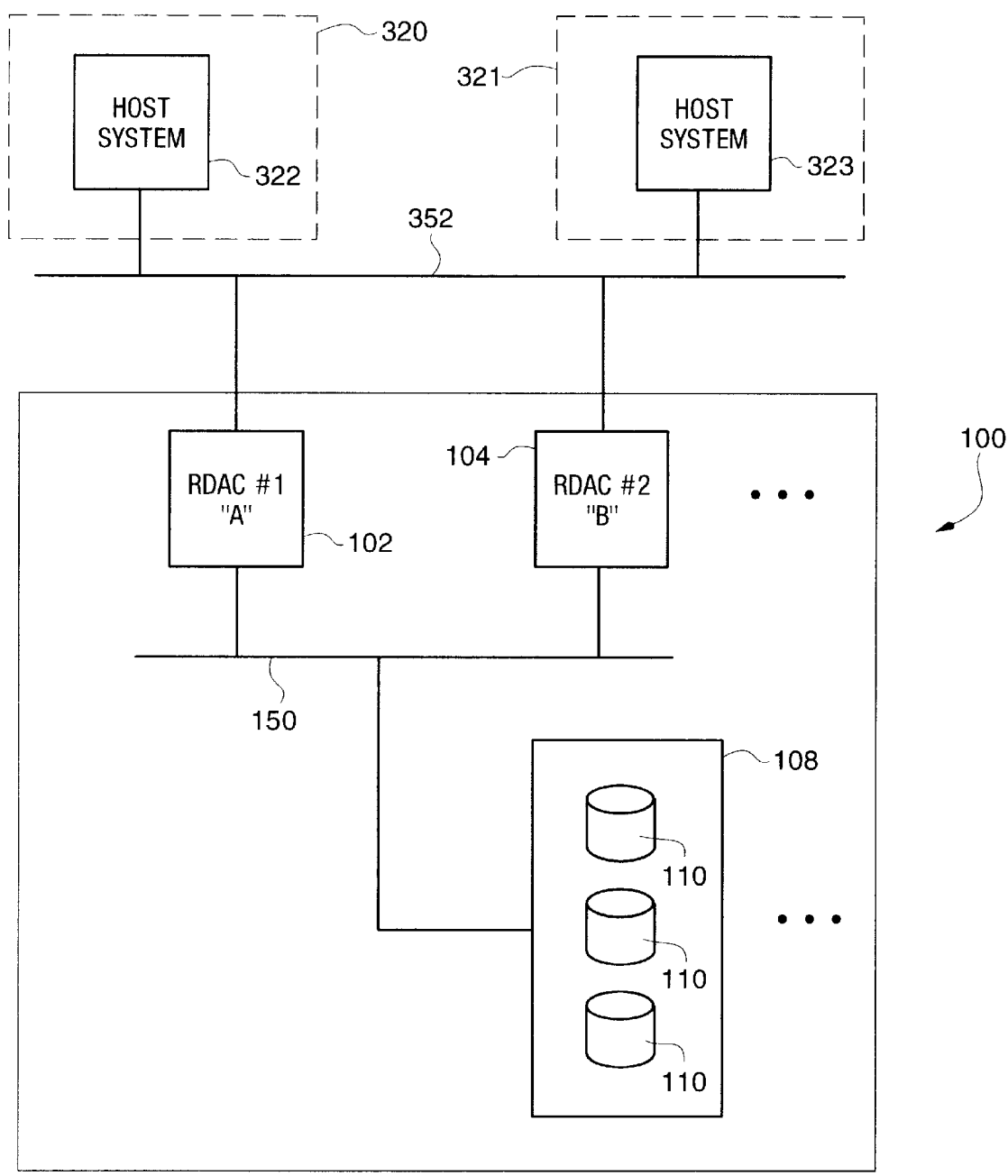
FIG. 3 is a block diagram of another computing environment in which either the back-end or front-end load balancing techniques of the present invention may be embodied.

FIGS. 1–3 depict typical topologies of connections between a storage system 100 having a plurality of controllers 102 and 104 and one or more host systems. As used herein, the term host system includes a general or special purpose computing systems, I/O interface adapters within computing systems, as well as any other device which generates I/O requests for processing by the plurality of controllers within the storage subsystem. As used herein, a controller is a device, often physically located within the storage subsystem, which controls the operation of the storage subsystem to perform I/O operations generated by one or more attached host systems. It will be readily recognized by those of ordinary skill in the art that a controller may also be embodied within an intelligent I/O adapter circuits which is physically located within a host system. FIGS. 1–3 are therefore intended as exemplary of topologies in which the methods of the present invention are operable. One of ordinary skill in the art will recognize several similar configurations in which the methods of the present invention may be advantageously applied.

BACK-END LOAD BALANCING CONFIGURATION

FIG. 1 depicts a typical storage subsystem topology in which the methods of the present invention are operable to perform back-end load balancing within the storage subsystem 100. In back-end load balancing, I/O requests and associated data are exchanged directly with the controller to which the host system directed the I/O request (the first controller). This first controller then determines whether another controller is better situated to process the I/O request and passes all required information (and data) to that controller (the second controller). Any completion information generated by processing of the I/O request within the second controller is transferred to the first controller and then returned to the requesting host system. Such completion information includes any read data to be returned in response to processing of an I/O read request by the second controller. In this manner, the method of the present invention is operable regardless of the topological connections between the host systems and the controllers. The first and second controller need not be commonly attached to the requesting host system.

FIG. 1 therefore depicts a storage subsystem 100 having a plurality of controllers including controllers 102 and 104. Controller 102 is also referred to herein as controller A while controller 104 is also referred to herein as controller B. Controller A and B are commonly attached via bus 150 to disk array 108 comprised of a plurality of disk drives 110. As is well known in the art, bus 150 may be any of several well known interconnection busses including for example, Fibre Channel (FC-AL), SCSI, EIDE, etc. This bus 150 provides communication between the controllers (102 and 104) and disk array 108 as well as communication between the controllers themselves. One skilled in the art will recognize that bus 150 may represent a single bus or a plurality of busses in combination which connect controllers to the disk array 108.

As noted elsewhere herein (such as in co-pending patent application 96-029), other communication media may be employed to provide a communication channel between the plurality of controllers (102 and 104, etc.) such as a shared memory, a dedicated communication channel in addition to the disk channel, etc. The methods of the present invention require only that some communication channel be present among the plurality of controllers implemented either within the disk communication channel (bus 150) or in addition thereto.

As shown in FIG. 1, controller A (102) is connected to a first host system 122 via bus 152 and controller B (104) is attached to a second host system 124 via bus 154. Host system 122 cannot therefore exchange I/O requests directly to controller B and host system 124 cannot exchange I/O requests directly with controller A. However, transparent to either host system (122 or 124), the attached controller (102 or 104, respectively) may transfer an I/O request to another controller for further processing. Each controller may exchange information with other commonly attached controllers via their common connection to bus 150 (or other intercontroller communication media as noted above).

One of ordinary skill will recognize that host systems 122 and 124 may represent physically distinct computing systems or simply distinct I/O adapters within a single computing system (indicated by dashed lines 120). Further, as noted above, the controllers 102 and 104 (etc.) may be distinct modules within the storage subsystem 100 as shown in FIG. 1 or may be integrated within intelligent I/O adapters physically housed within one or more host systems (e.g., 120–124 of FIG. 1). FIG. 1 is therefore intended to suggest several equivalent topologies in which two (or more) controllers of a storage subsystem share a communication channel on their respective back-ends (i.e., the disk channel) though they may or may not share a communication channel to a common host system. Such a topological configuration requires application of the back-end load balancing methods of the present invention as discussed below in additional detail.

FRONT-END LOAD BALANCING CONFIGURATIONS

FIGS. 2 and 3 depict typical storage subsystem topologies in which the methods of the present invention are operable to perform front-end load balancing within the storage subsystem 100. In front-end load balancing, I/O requests are exchanged directly with the controller to which the host system directed the I/O request (the first controller). This first controller then determines whether another controller is better situated to process the I/O request and passes the I/O request information (but not necessarily the data associated therewith) to that controller (the second controller). Any completion information generated by processing of the I/O request within the second controller is transferred directly by the second controller to the requesting host system. The completion information include ID field information which identifies the source of the completion information. Where necessary for the host communication medium and protocol, the second controller presents false ID field information to the host system so that the host system believes it is in fact communicating with the first controller. As noted above, such false or fake ID information includes more generally any means for substitute the second controller for the first in communications with the host systems. Completion information includes any read data to be returned in response to processing of an I/O read request by the second controller. In accordance with the front-end load balancing methods of the present invention, the first and second controller must be commonly attached to the requesting host system.

FIG. 2 therefore depicts the storage subsystem 100 (as in FIG. 1) wherein both controller A (102) and controller B (104) are connected to a first host system 222 via bus 252. Both controllers (102 and 104) may therefore exchange information directly with host system 222. However, transparent to host system 222, the attached controller (102 or 104, respectively) may transfer an I/O request to another controller for further processing. Each controller may exchange information with other commonly attached controllers via their common connection to bus 150 (or other intercontroller communication media as noted above).

One of ordinary skill will recognize that host system 222 may represent a computing system or simply an I/O adapter within a computing system (indicated by dashed lines 220). Further, as noted above, controllers 102 and 104 (etc.) may be distinct modules within the storage subsystem 100 as shown in FIG. 1 or may be integrated within intelligent I/O adapters physically housed within a host system (e.g., 220 of FIG. 2). FIG. 2, like FIG. 1, is therefore intended to suggest several equivalent topologies in which two (or more) controllers of a storage subsystem share a communication channel on their respective back-ends (i.e., the disk channel) and share a communication channel to a common host system.

Specific requirements of the topology of the controller and host system connections as well as the specifications of the communication medium and protocols therebetween determine, in part, the selection of front-end versus back-end load balancing techniques of the present invention. Certain topological configurations permit application of either the back-end load balancing methods as noted above or the front-end load balancing of the present invention as discussed below in additional detail.

FIG. 3 provides yet another exemplary topological configuration in which back-end or front-end load balancing methods of the present invention may be advantageously applied. Storage subsystem 100, as above, includes a plurality of controllers 102, 104, etc. which share common access to a disk array 108 (comprised of a plurality of disk drives 110) via bus 150. The controllers also are commonly attached to a plurality of host systems 322 and 323 via bus 352. The configuration of FIG. 3 extends the exemplary configuration of FIG. 2 above to suggest the connectivity of a plurality of controllers (102,104, etc.) to a plurality of host systems (322, 323, etc.).

As noted above with respect to FIG. 2, host systems 322 and 323 may represent computing systems or simply I/O adapters within computing systems (indicated by dashed lines 320 and 321). Further, as noted above, controllers 102 and 104 (etc.) may be distinct modules within the storage subsystem 100 as shown in FIG. 1 or may be integrated within intelligent I/O adapters physically housed within a host system (e.g., 320 and 321 of FIG. 3). FIG. 3, like FIGS. 1 and 2, is therefore intended to suggest several equivalent topologies in which two (or more) controllers of a storage subsystem share a communication channel on their respective back-ends (i.e., the disk channel) and share a communication channel to at least one common host system. Such a topological configuration permits application of the back-end load balancing methods as noted above as well as the front-end load balancing of the present invention as discussed below in additional detail.

BACK-END LOAD BALANCING METHODS

Figure 4:
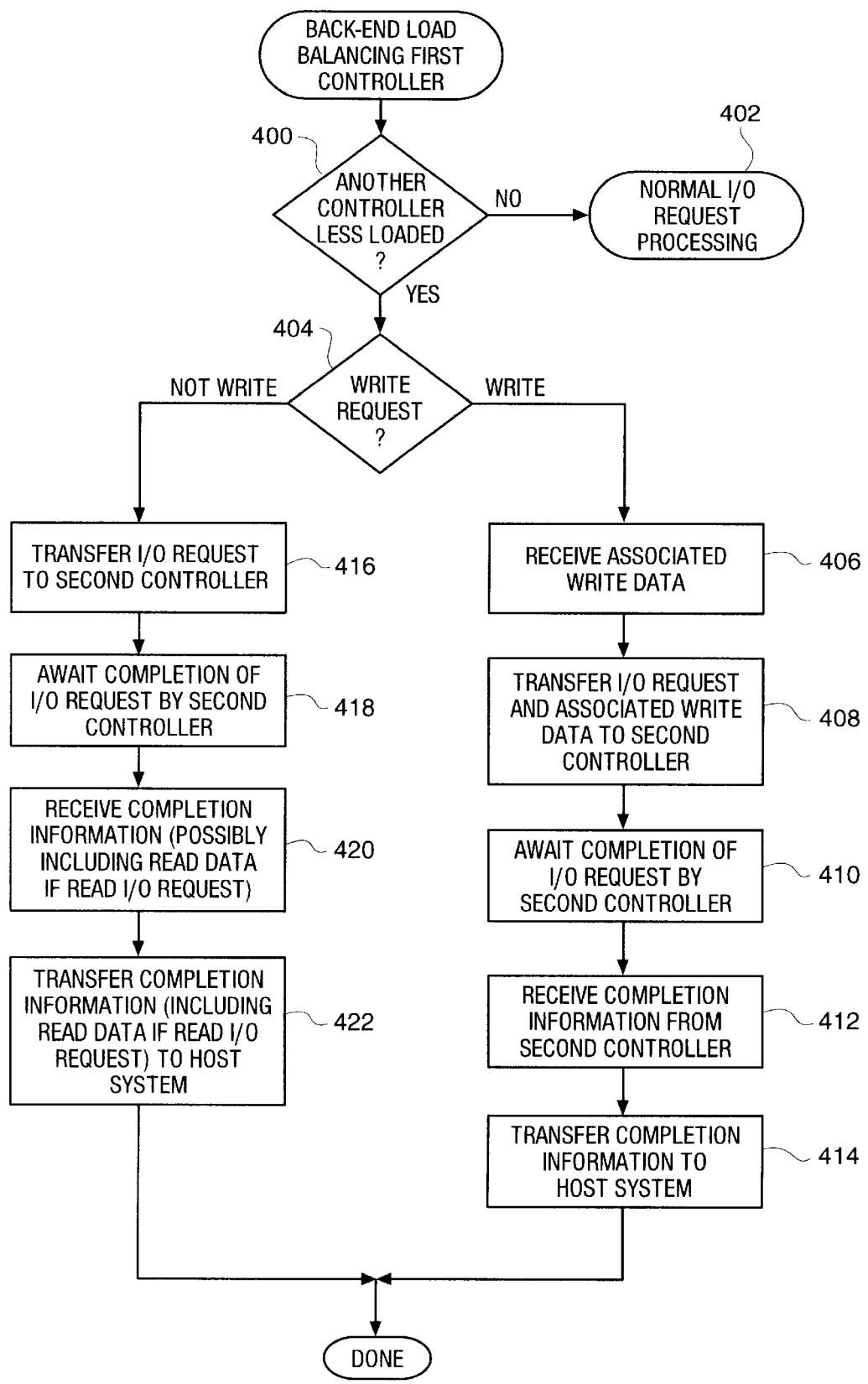
FIG. 4 is a flowchart describing the operation of the first controller in the back-end load balancing methods of the present invention.
Figure 5:
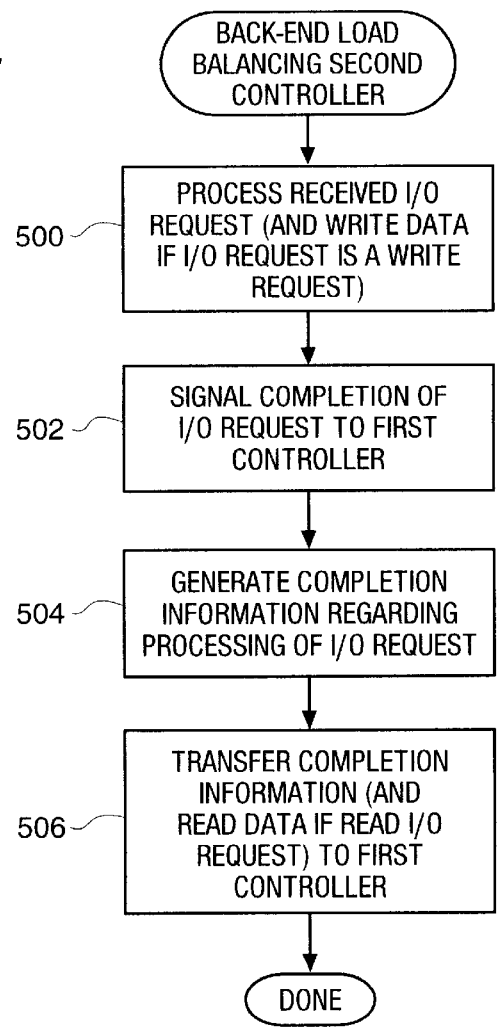
FIG. 5 is a flowchart describing the operation of the second controller in the back-end load balancing methods of the present invention.

FIGS. 4 and 5 are flowcharts describing the operation of the methods of the present invention for performing back-end load balancing within a storage subsystem. As noted above, back-end load balancing may be utilized in any of the topology configurations discussed above with respect to FIGS. 1–3. In back-end load balancing a host system initiates an I/O request with a first controller of the plurality of controllers. The first controller, in accordance with the methods of the present invention determines whether another controller of the plurality of controllers is less loaded than the first controller and is therefore better suited to process the I/O request. If such a controller is available, the first controller transfers the I/O request to the second controller by exchanging appropriate messages. In addition, if the I/O request is a write request, the first controller receives the write data associated with the I/O request from the host system and transfers the write data to the second controller.

The second controller then processes the I/O request in accordance with standard I/O request processing techniques within the controller. When the I/O request processing is completed, the second controller generates any required completion information and returns same to the first controller. Completion information as used herein includes any status or sense data as well as read data if the I/O request processed was a read request. The first controller then completes the I/O request by transferring any completion information back to the requesting host system. This method of the present invention permits balancing of the processing loads among a plurality controllers of a storage subsystem. The load balancing in accordance with this method is transparent to the host system and therefore obviates the need for modification of legacy host systems.

The flowchart of FIG. 4 describes the operation of back-end load balancing methods of the present invention as operable within the first controller (the controller to which the host system directs the I/O request). In particular, element 400 of FIG. 4 is operable to determine whether another controller of the plurality of controllers of the storage subsystem is less loaded than the first controller. If such is not the case, then the present controller (the first controller) simply processes the I/O request in its normal course of processing as indicated by element 402. Otherwise, element 404 is next operable to determine whether or not the I/O request is a write request.

Any of several techniques may be applied within methods of the present invention to determine the relative processing loads among a plurality of controllers. One of ordinary skill will readily recognize that the primary controller of a particular LUN in the storage subsystem is aware of each controller's access to that LUN. The primary controller may therefore maintain a statistical model of the relative processing load of each controller associated with it's LUN. Other equivalent techniques may be evident to those skilled in the art.

If element 404 determines that the I/O request is a write request, elements 406–414 are next operable to process the I/O write request by transferring it to the second controller identified by element 400. Otherwise, if the I/O request is other than a write request, elements 416–422 are next operable to process the request by transferring it to the second controller identified by operation of element 400.

Element 406 is operable to receive the write data from the host system associated with the I/O write request. Element 408 then transfers the I/O write request and the associated write data to the second controller identified by operation of element 400. Element 410 then awaits completion of processing of the I/O write request by the second controller. Well known multi-tasking techniques may be employed to permit other processing within the first controller to proceed while the second controller processes the I/O write request and its associated write data.

When the second controller has completed its processing of the I/O write request, element 412 is next operable to receive within the first controller completion information generated by the second controller. Such completion information may include sense and status data corresponding to the results of processing the I/O write request by the second controller. Element 414 then transmits this completion information to the host system which initiated the I/O write request to thereby complete processing of the I/O write request by the first and second controllers.

One of ordinary skill will recognize that the definition of completion of the I/O write request in the second controller may vary according to the cache architecture of the controllers. For example, if the second controller operates in a cache write-back mode, completion, as used herein, means receipt of the write data in the cache memory. Subsequent posting or flushing of the cached data may occur at a later time.

Elements 416–422 are operable in response to a determination by element 404 that the I/O request is not a write request (e.g., an I/O read request). Element 416 is operable to transmit the I/O request to the second controller identified by operation of element 400 above. Element 418 then awaits completion of processing of the I/O request by the second controller. As noted above, well known multi-tasking techniques may be employed to permit continued processing of other I/O requests within the first controller while awaiting completion of processing of the present I/O request by the second controller.

When the second controller completes processing of the I/O request, element 420 is operable to receive completion information regarding the processing of the I/O request by the second controller. If, for example, the I/O request was a read request the completion information (as used herein) may include the requested data to be returned to the initiating host system. Element 422 is then operable to transfer the completion information (including the read data if the I/O request was a read request) to the initiating host system to thereby complete processing of the I/O request by the first and second controllers.

FIG. 5 is a flowchart describing the operation of the back-end load balancing methods of the present invention within the second controller. The method of FIG. 5 is operable in response to receipt of an I/O request (read request, write request, or other requests) transferred from a first controller in response to its determination that the second controller is less loaded than the first controller. Element 500 is first operable within the second controller to process the I/O request received from the first controller. As noted above, an I/O write request is received in conjunction with its associated write data. Further, as noted above with respect to elements 410–414, the definition of processing of the I/O request as used herein varies in accordance with the cache architecture of the controllers. A write-back cache controller architecture processes the request by entering the write data in its cache memory. Subsequent posting or flushing of the data in cache occurs at a later time.

Element 502 is next operable to signal to the first controller completion of the received I/O request by the second controller. This signal step represents the processing required to resume the processing within the first controller which suspended awaiting the completion of the I/O request within the second controller. Well known multi-tasking techniques may be applied to transmit such interprocess signals among the various processes.

Elements 504 and 506 are then operable to generate, and transmit to the first controller, respectively, the completion information regarding the results of processing the I/O request within the second controller. As noted above, the completion information includes any read data generated by processing of an I/O read request within the second controller.

These back-end load balancing methods of the present invention described above with respect to FIGS. 4 and 5 provide load balancing among a plurality of controllers in a manner transparent to the attached host systems. The I/O requests as well as associated data and status information are transferred by the exchange of messages among the commonly attached controllers. However, in accordance with the back-end load balancing methods discussed above, the initiating host systems communicate directly with the particular controller to which the I/O request is initially directed.

FRONT-END LOAD BALANCING METHODS

As noted above, the methods of the present invention include front-end load balancing methods wherein the host system initially transfers an I/O request to a first controller however subsequent communications with a controller may be with the second controller to which the first controller redirected the request. The second controller uses a false ID field value in communications with the initiating host system. The fake ID field is sufficient to fool the host system such that it believes that it is communicating directly with the first controller. Thus front-end load balancing, in accordance with the present invention, permits the balancing of processing loads among the plurality of controllers while eliminating the need for read or write data associated with the I/O request to be transferred initially to the first controller, then from the first controller to the second controller. Rather, the second controller (using a fake ID field value) exchanges read or write data directly with the host system so that the data is transferred but once.

Figure 6:
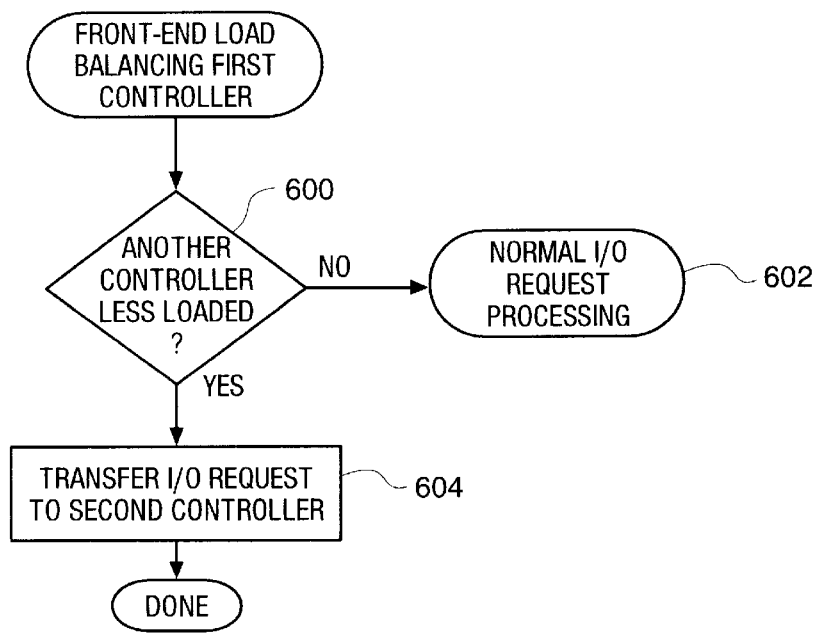
FIG. 6 is a flowchart describing the operation of the first controller in the front-end load balancing methods of the present invention.

FIG. 6 is a flowchart describing the operation of the front-end load balancing method of the present invention as operable within the first controller, the controller to which the host system initially directs the I/O request. Element 600 is operable in response to receipt of an I/O request in the same manner as element 400 of FIG. 4 discussed above to determine if another of the plurality of controllers is better suited to process the received I/O request. If no other controller is less loaded than this the first controller, then element 602 is next operable and represents the normal processing of an I/O request within the first controller. Otherwise, processing continue with element 604. Element 604 is next operable to transfer the received I/O request to the second controller identified by operation of element 400 to be better suited to processing the received I/O request. The first controller thereby completes it processing of the received I/O request. The first controller need not await completion of the I/O request because any further communications required between the host system and a controller will be directly between the second controller (with a fake ID field value) and the initiating host system.

Figure 7:
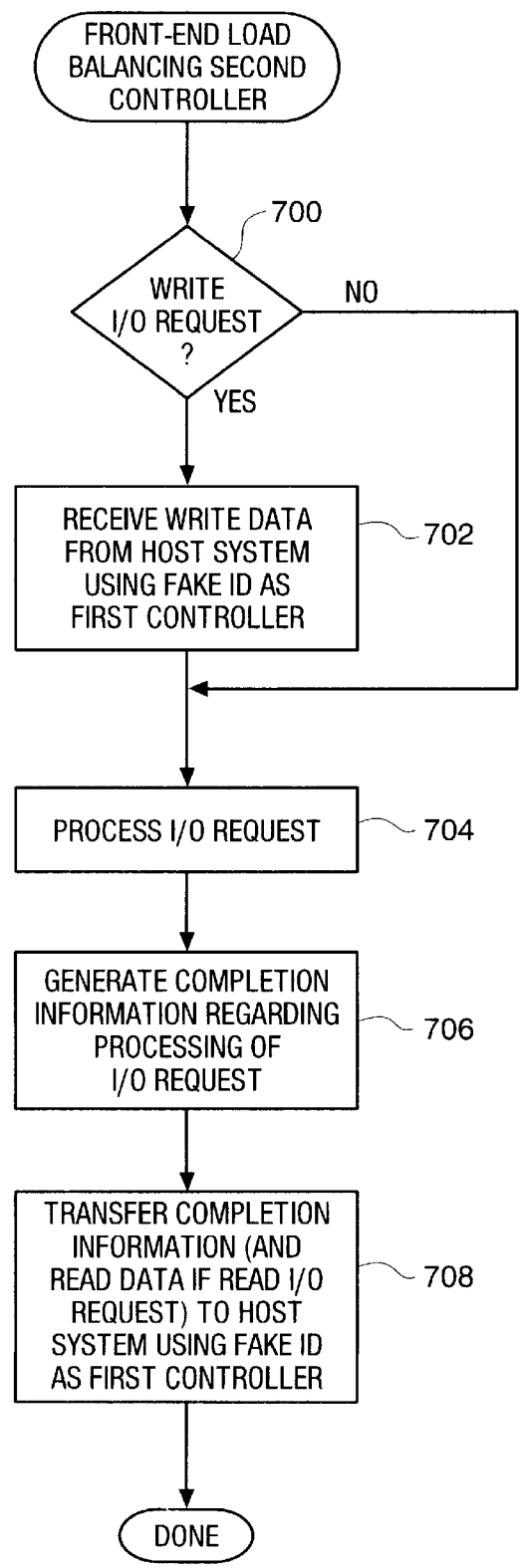
FIG. 7 is a flowchart describing the operation of the second controller in the front-end load balancing methods of the present invention.

FIG. 7 is a flowchart describing the operation of the front-end load balancing method of the present invention as operable within the second controller to which a received I/O request has been transferred. Element 700 is first operable in response to receipt of the transferred I/O request to determine whether or not the request is a write request. If the request is an I/O write request, then element 702 is next operable to receive from the initiating host system the write data associated with the I/O write request. As noted above, the second controller uses a fake ID field value in this exchange of write data so that the host system operates in all respects as though it is exchanging write data with the first controller. Element 704 is then operable to process the received I/O request.

Elements 706 and 708 are then operable to generate any completion information to be returned to the initiating host system. Element 706 generates such completion information as sense and status data reflecting the results of processing the transferred I/O request. Element 708 is then operable to transfer to the host system the completion information plus any read data requested if the I/O request was a read request. As noted elsewhere herein, the second controller utilizes a fake ID field value so as to fool the host system into interacting with what it believes to be the first controller.

These front-end load balancing methods of the present invention described above with respect to FIGS. 6 and 7 provide load balancing among a plurality of controllers in a manner transparent to the attached host systems. The I/O requests are transferred from the host system to the first controller. The first controller passes the I/O request to a less loaded second controller (if necessary). All further exchange of data and information to complete the I/O request is then performed between the second controller and the host system to eliminate any need to move such information twice (i.e., from host to first controller then to second controller and back). The second controller, in accordance with the front-end load balancing of the present invention, uses a fake ID field to interact with the host system just as the first controller would have.

APPLICABILITY OF FRONT VS. BACK END LOAD BALANCING

As noted above, when the first and second controller do not share a common communication channel to the initiating host system, it is necessary to use the back-end load balancing techniques described above. Only the first controller can communicate with the host system so as to permit transparent load balancing within the storage devices and adapters. If both the first and second controllers share a common communication channel with the host system, then front-end load balancing techniques as above may be employed to reduce the extra overhead of moving data and information between the first and second controllers. However, the communication channel used to exchange information between the controller and the host system must allow the second controller to apply a fake ID field value so as to permit the host system to operate as though it is in fact communicating with the first controller. For example, Fibre Channel communication media and protocols may be designed to separate the physical address of a device from the addresses used by a host system to direct an I/O request. In such an environment, the second controller may temporarily map its physical address to the address used by the host system to identify the first controller.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. In a storage subsystem having a plurality of controllers, a method for balancing the I/O request processing load over said plurality of controllers comprising the steps of:

receiving an I/O request from an attached host system within a first controller of said plurality of controller;

determining within said first controller independent of said attached host system that a second controller of said plurality of controllers is less loaded than said first controller;

transferring control of said I/O request from said first controller to said second controller independent of said attached host system for further processing in response to the determination that said second controller is less loaded than said first controller;

generating completion information within said second controller in response to said further processing of said I/O request; and returning said completion information to said attached host system wherein said attached host system is unaware of said transferring of control wherein the step of returning includes the steps of:

substituting said second controller for said first controller in communicating with said attached host system for purposes of further processing of said I/O request; and transmitting said completion information from said second controller to said attached host system wherein said first controller appears to said attached host system to be the source of said completion information.

2. The method of claim 1 wherein said completion information includes an ID field to identify the source of said completion information and wherein said method further comprises the step of:

transmitting said completion information from said second controller to said attached host system, wherein said ID field identifies said first controller as the source of said completion information.

3. The method of claim 2 wherein said I/O request is a write request having write data associated therewith and wherein said method further comprises the step of:

transmitting said write data from said attached host system to said second controller.

4. The method of claim 2 wherein said I/O request is a read request and wherein said completion information includes read data requested by said read request.

5. In a storage subsystem having a plurality of controllers commonly attached to a host system and commonly attached to storage devices within the storage subsystem, a front-end write load balancing method comprising the steps of:

receiving, within a first controller of said plurality of controllers, an I/O write request from said host system;

determining within said first controller independent of said host system that a second controller of said plurality of controllers is less loaded than said first controller;

transferring said I/O write request from said first controller to said second controller independent of said host system for further processing in response to the determination that said second controller is less loaded than said first controller;

receiving, within said second controller from said host system, write data associated with said I/O write request wherein said host system is unaware of said transferring said I/O write request;

generating completion information within said second controller in response to said further processing of said I/O write request; and returning said completion information from said second controller to said host system.

6. The method of claim 5 wherein the step of returning said completion information includes the steps of:

substituting said second controller for said first controller in communicating with said host system for purposes of further processing of said I/O request; and transmitting said completion information from said second controller to said host system wherein said first controller appears to said host system to be the source of said completion information.

7. The method of claim 6 wherein said completion information includes an ID field to identify the source of said completion information and wherein the step of returning said completion data includes the step of:

transmitting said completion information from said second controller to said host system wherein said ID field identifies said first controller as the source of said completion information.

8. In a storage subsystem having a plurality of controllers commonly attached to a host system and commonly attached to storage devices within the storage subsystem, a front-end read load balancing method comprising the steps of:

receiving, within a first controller of said plurality of controllers, an I/O read request from said host system;

determining within said first controller independent of said host system that a second controller of said plurality of controllers is less loaded than said first controller;

transferring said I/O read request from said first controller to said second controller independent of said host system for further processing in response to the determination that said second controller is less loaded than said first controller;

generating completion information within said second controller in response to said further processing of said I/O read request; and returning said completion information from said second controller to said host system wherein said host system is unaware of said transferring said I/O read request.

9. The method of claim 8 wherein said completion information includes read data requested by said I/O read request.

10. A program storage device readable by a computer, tangibly embodying a program or instructions executable by computers in a plurality of controllers connecting a plurality of attached host systems to a common storage subsystem to perform the method steps for balancing the I/O request processing load over said plurality of controllers, said method steps comprising:

receiving an I/O request from an attached host system within a first controller of said plurality of controllers;

determining within said first controller independent of said host system that a second controller of said plurality of controllers is less loaded than said first controller;

transferring control of said I/O request from said first controller to said second controller independent of said host system for further processing in response to the determination that said second controller is less loaded than said first controller;

generating completion information within said second controller in response to said further processing of said I/O request;

returning said completion information to said attached host system wherein said attached host system is unaware of said transferring of control wherein the step of returning includes the steps of:

substituting said second controller for said first controller in communicating with said attached host system for purposes of further processing of said I/O request; and transmitting said completion information from said second controller to said attached host system wherein said first controller appears to said attached host system to be the source of said completion information.

11. The program storage device of claim 10 wherein said completion information includes an ID field to identify the source of said completion information and wherein the method further comprises the step of:

transmitting said completion information from said second controller to said attached host system, wherein said ID field identifies said first controller as the source of said completion information.

12. The program storage device of claim 11 wherein said I/O request is a write request having write data associated therewith and wherein the method further comprises the step of:

transmitting said write data from said attached host system to said second controller.

13. The program storage device of claim 11 wherein said I/O request is a read request and wherein said completion information includes read data requested by said read request.

* * * * *